No. 655,466. Patented Aug. 7, 1900.
J. TODD.
SILO.
(Application filed Mar. 8, 1900.)
(No Model.) 3 Sheets—Sheet 1.
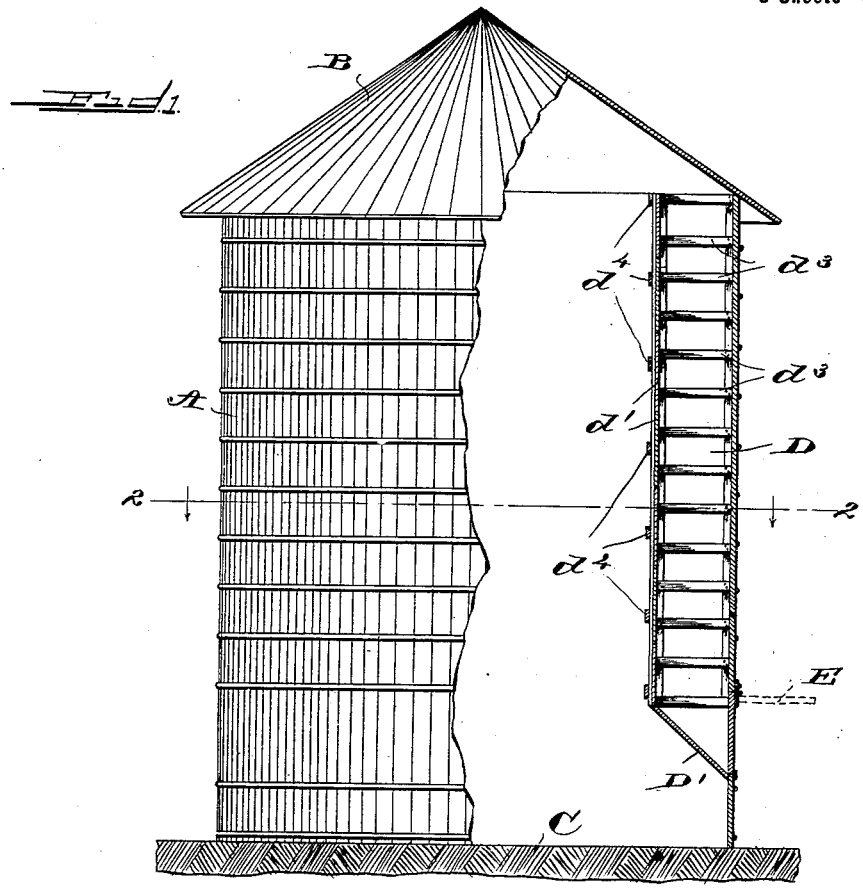
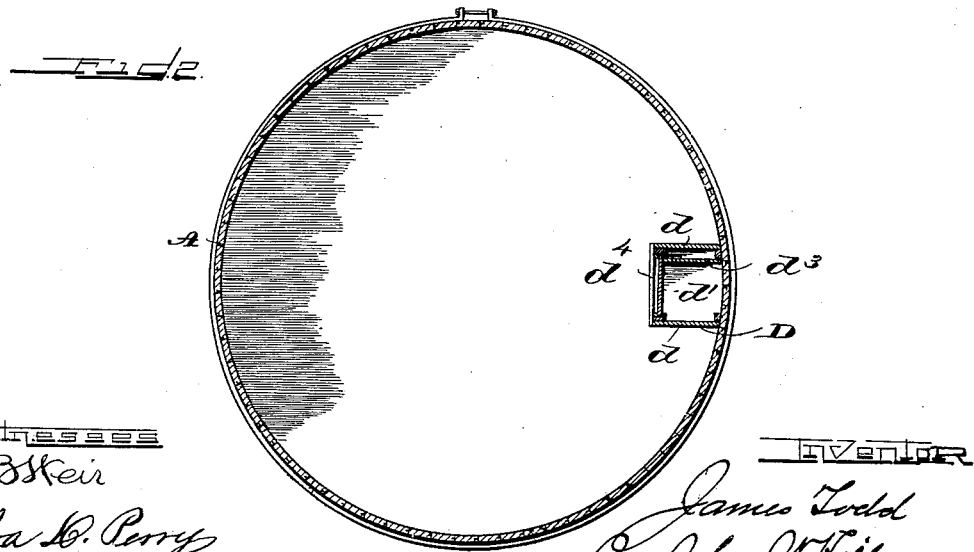

No. 655,466. Patented Aug. 7, 1900.
J. TODD.
SILO.
(Application filed Mar. 8, 1900.)
(No Model.) 3 Sheets—Sheet 2.
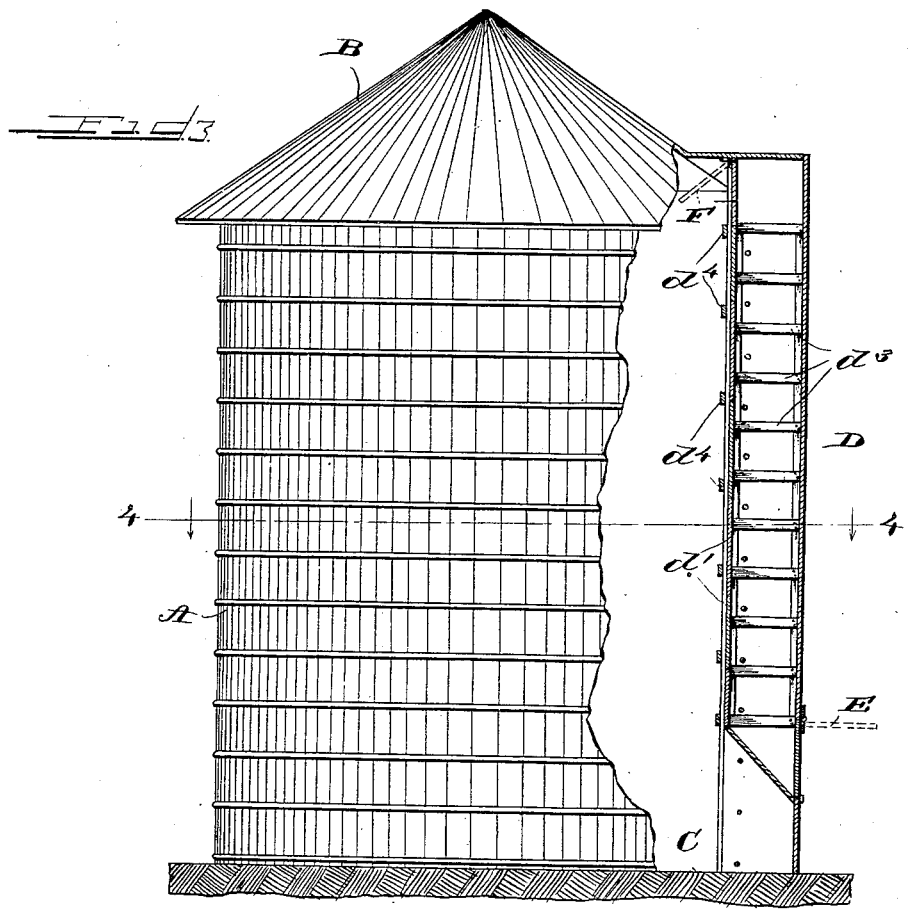
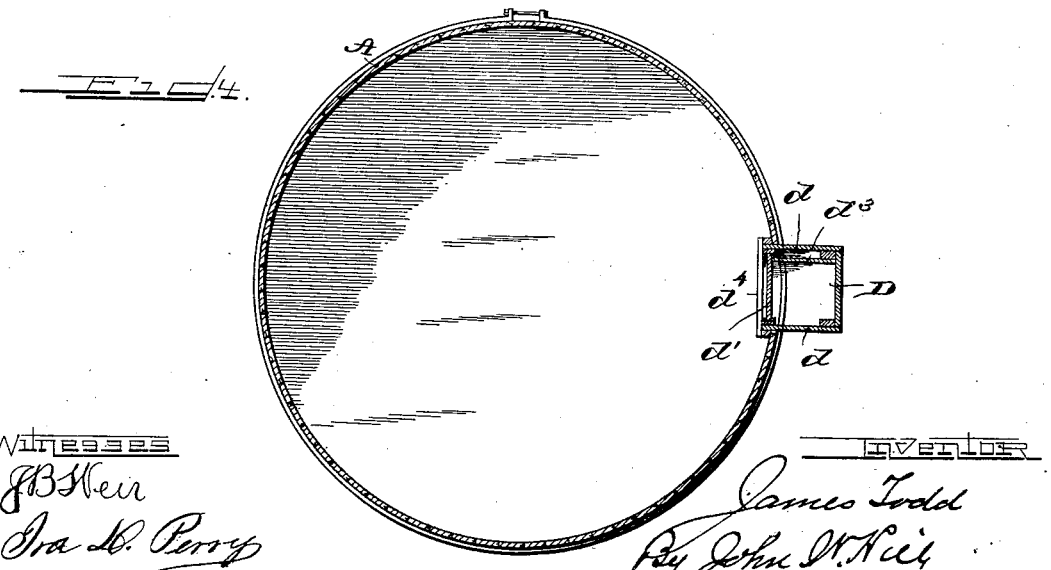

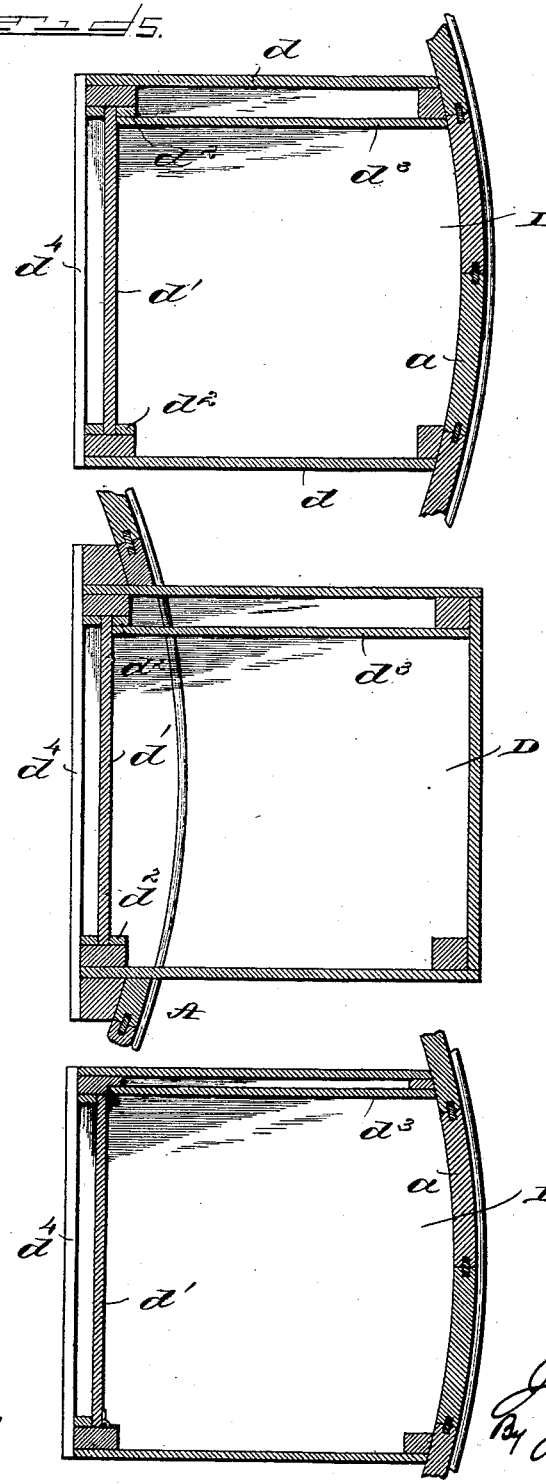

United States Patent Office.

JAMES TODD, OF BATAVIA, ILLINOIS, ASSIGNOR TO THE CHALLENGE WINDMILL AND FEEDMILL COMPANY, OF SAME PLACE.

SILO.

SPECIFICATION forming part of Letters Patent No. 655,466, dated August 7, 1900.

Application filed March 8, 1900. Serial No. 7,939. (No model.)

*To all whom it may concern:*

Be it known that I, JAMES TODD, a citizen of the United States of America, residing at Batavia, in the county of Kane, in the State of Illinois, have invented a certain new and useful Improvement in Silos, of which the following is a description.

Referring to the accompanying drawings, wherein like reference-letters indicate like or corresponding parts, Figure 1 is a side elevation of a silo provided with my improvement with parts broken away to show the construction. Fig. 2 is a transverse section of the same in line 2 2 of Fig. 1. Fig. 3 is a side elevation of a silo provided with a modified form of my improvement. Fig. 4 is a transverse section in line 4 4 of Fig. 3, and Figs. 5, 6, and 7 are detail views.

The object of my invention is to produce a silo provided with simple and efficient means for admittance thereto without exposing the contents of the silo to the influence or effects of the exterior air and light.

To this end my invention consists in the novel construction and combination of parts herein shown and described, and more particularly pointed out in the claims.

In the drawings I have shown my invention as applied to a well-known form of silo circular in outline and composed of staves and hoops, as is the case with large-sized tanks.

In the drawings, A represents a silo of the general type described, provided with a suitable roof B and supported upon a suitable base C.

D is a closed chute extending from a point near the bottom of the silo to near the top of the same, as shown. The sides of the chute are inclosed by any suitable means—for example, by boards $d$ $d$—while one side is provided with suitable doors $d'$, which may be constructed to slide in suitable ways $d^2$ $d^2$, as shown in Fig. 5, or may be hinged, as shown in Fig. 7. Suitable means are employed to retain the doors in their closed position. These doors may serve as a means of closing a continuous opening into the interior of the silo, or, if preferred, they may serve as coverings for a series of door-openings arranged one above the other. Upon one side of the chute I construct a ladder provided with rounds $d^3$ to afford convenient means for ascending the chute to any point desired. Suitable doors E serve to close the lower end of the chute, while, if desired, doors F may also be provided to close the upper end of the chute. Stays $d^4$ serve to brace the chute and strengthen the same.

In the preferred form the chute is arranged upon the inside of the silo, as shown in Figs. 1, 2, 5, and 7. When so constructed, the staves $a$ serve to close the outer side of the chute, as shown. If desired, however, the chute may be constructed upon the outside of the silo, as shown in Figs. 3, 4, and 6. As thus shown, an opening is formed for the doors through the side of the staves. In this form I prefer that the hoops extend through the chute, so as not to weaken the construction of the silo.

The mode of operation is as follows: The operator opening the lower door ascends the chute to the level of the top of the ensilage and opening the door enters the silo and with a suitable implement throws the desired quantity of ensilage through the opening into the chute, from which point it falls to the bottom of the chute and thence outward. Having completed this, the operator again enters the chute, closing the door after him, and descending closes the lower door, when the silo is securely closed, as before. When the chute is placed upon the inside of the silo, I prefer to arrange an incline D' at the bottom of the chute leading to the exterior of the silo. As the ensilage falls upon this it is discharged outside the silo.

After having thus described my improvement it is obvious that many immaterial modifications may be made without departing from the spirit of my invention. Thus, if desired, a door at the top of the chute may be dispensed with, the lower door sufficiently serving the purpose of closing the chute. In other cases the lower door may be dispensed with, an upper door closing that end of the chute being satisfactory for the purpose described. The form and construction of the chute may be modified as desired and the details varied in a variety of ways. Thus I do not desire to be understood as limiting myself to the exact form and construction shown.

The silo may be filled in the ordinary manner through a suitable door in the roof B, which, if desired, may be so located as to be easily accessible from the top of the ladder in the chute.

Having thus described my invention, what I claim as new, and desire to secure by Letters Patent, is—

1. A silo, in combination with an inclosed chute arranged to admit an operator to the interior of the silo at any desired level, and having an unobstructed passage serving to conduct the ensilage from the interior of the silo to the exterior thereof, substantially as described.

2. A silo, provided with an inclosed chute having an unobstructed passage and arranged to conduct the ensilage from the interior of the silo to the exterior thereof, in combination with a plurality of doors arranged to afford entrance to the silo at any desired level from the chute and means for closing the chute, substantially as described.

3. A silo, provided with a chute forming a part thereof and having an unobstructed passage and arranged to conduct the ensilage from the interior to the exterior of the silo, in combination with a plurality of doors affording entrance from the chute into the silo at different levels, a ladder arranged within the chute, and means for externally closing the chute, substantially as described.

4. A silo, provided with a chute D arranged within the walls of the silo and having an unobstructed passage serving to conduct the ensilage from the interior of the silo to the exterior, in combination with a plurality of doors $d'$, a ladder within the chute and means for closing the entrance of the chute, substantially as described.

5. A silo, provided with a chute D arranged within the walls thereof, in combination with a plurality of doors $d'$ retained in position by suitable guides, a ladder within the chute and arranged to have the chute an unobstructed passage for the ensilage, an incline $D'$ at the bottom thereof, and a door E for closing the entrance to the chute, substantially as described.

6. A silo, provided at one side with a chute D having an inclined bottom $D'$, a door above the inclined bottom to permit the passage of the ensilage from the chute, a door or doors affording communication between the chute and the silo, and a ladder arranged at one side of the chute so as to leave an unobstructed passage therein to the inclined bottom, substantially as described.

JAMES TODD.

Witnesses:
L. A. WHITING,
THOS. L. MAIR.